(12) United States Patent
Strickland

(10) Patent No.: US 8,452,254 B2
(45) Date of Patent: May 28, 2013

(54) SELECTING AND ROUTING SUB-SIGNALS FROM A COMMON SIGNAL PATH

(75) Inventor: Lawrence P. Strickland, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 358 days.

(21) Appl. No.: 12/860,009

(22) Filed: Aug. 20, 2010

(65) Prior Publication Data
US 2012/0046006 A1 Feb. 23, 2012

(51) Int. Cl.
*H04B 1/10* (2006.01)

(52) U.S. Cl.
USPC .................... 455/307; 455/338; 455/101

(58) Field of Classification Search
CPC ........................................................ H04B 1/10
USPC ......... 455/133, 280–282, 286, 307, 338–339, 455/101
See application file for complete search history.

(56) References Cited

U.S. PATENT DOCUMENTS

| | | | |
|---|---|---|---|
| 3,898,592 A | 8/1975 | Solie | |
| 2002/0136276 A1* | 9/2002 | Franceschini et al. | 375/148 |
| 2003/0211850 A1 | 11/2003 | Chen et al. | |
| 2005/0281210 A1 | 12/2005 | Makino | |
| 2007/0190954 A1 | 8/2007 | Murakami et al. | |
| 2008/0079515 A1* | 4/2008 | Ayazi et al. | 333/187 |
| 2009/0067103 A1 | 3/2009 | Kijima et al. | |

OTHER PUBLICATIONS

Intellectual Property Office, Patents Directorate, South Wales, Patents Act 1977: Search Report under Section 17(5) mailed Sep. 6, 2011, regarding patent application GB 1108853.1., Sep. 6, 2011.
MuRata, *Inventor in Electronics*, Piezo Filters Introduction, Piezoelectric Theory as Applied to Ceramic Filters, CG01-J, www.linearparts.com/documents/murata.pdf, pp. 426-430, Printed Jun. 25, 2010.

\* cited by examiner

*Primary Examiner* — Christian Hannon
(74) *Attorney, Agent, or Firm* — Daly, Crowley, Mofford & Durkee, LLP

(57) ABSTRACT

According to certain embodiments, a system comprises a main transmission line, one or more piezoelectric filters coupled to the main transmission line, and one or more sub-signal transmission lines coupled to the one or more piezoelectric filters. The main transmission line communicates a main signal from an antenna to a main receiver. Each piezoelectric filter selects a sub-signal of a specific center frequency. Each sub-signal transmission line communicates a sub-signal to a sub-signal receiver.

18 Claims, 3 Drawing Sheets

SELECTING AND ROUTING SUB-SIGNALS FROM A COMMON SIGNAL PATH

GOVERNMENT FUNDING

The U.S. Government may have certain rights in this invention as provided for by the terms of Contract No. FA8709-04-C-0011 awarded by the U.S. Department of Defense.

TECHNICAL FIELD

This invention relates generally to the field of communication systems and more specifically to selecting and routing sub-signals from a common signal path.

BACKGROUND

Emergency guard channels may be used in emergency situations. For example, guard channels may be used to transmit distress messages from aircraft or to communicate with aircraft that cannot be contacted on their assigned communications channel. Aircraft personnel, such as aircraft crews and air traffic controllers, may communicate on assigned main channels, while continuously monitoring guard channels.

SUMMARY OF THE DISCLOSURE

In accordance with the present invention, disadvantages and problems associated with previous techniques for selecting and routing sub-signals from a common signal path may be reduced or eliminated.

According to certain embodiments, a system comprises a main transmission line carrying main and sub-signals, one or more piezoelectric filters coupled to the main transmission line, and one or more sub-signal transmission lines coupled to the one or more piezoelectric filters. The main transmission line communicates a main signal from an antenna to a main receiver. Each piezoelectric filter selects a sub-signal of a specific center frequency. Each sub-signal transmission line communicates a sub-signal to a sub-signal receiver.

Certain embodiments of the invention may provide one or more technical advantages. A technical advantage of one embodiment may be that the piezoelectric filters may have a relatively narrow bandwidth and may more precisely select signals without causing significant reduction in the quality and/or quantity of usable channels of the main receiver. Another technical advantage of one embodiment may be that the piezoelectric filters may be smaller and/or lighter than traditional multiplexing filters, and thus may not impose significant size and/or weight restrictions. The small size of the piezoelectric filters may also permit multiple sub-signal selection to individual sub-signal receivers or to a common sub-signal receiver via a second multiplexing interface.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
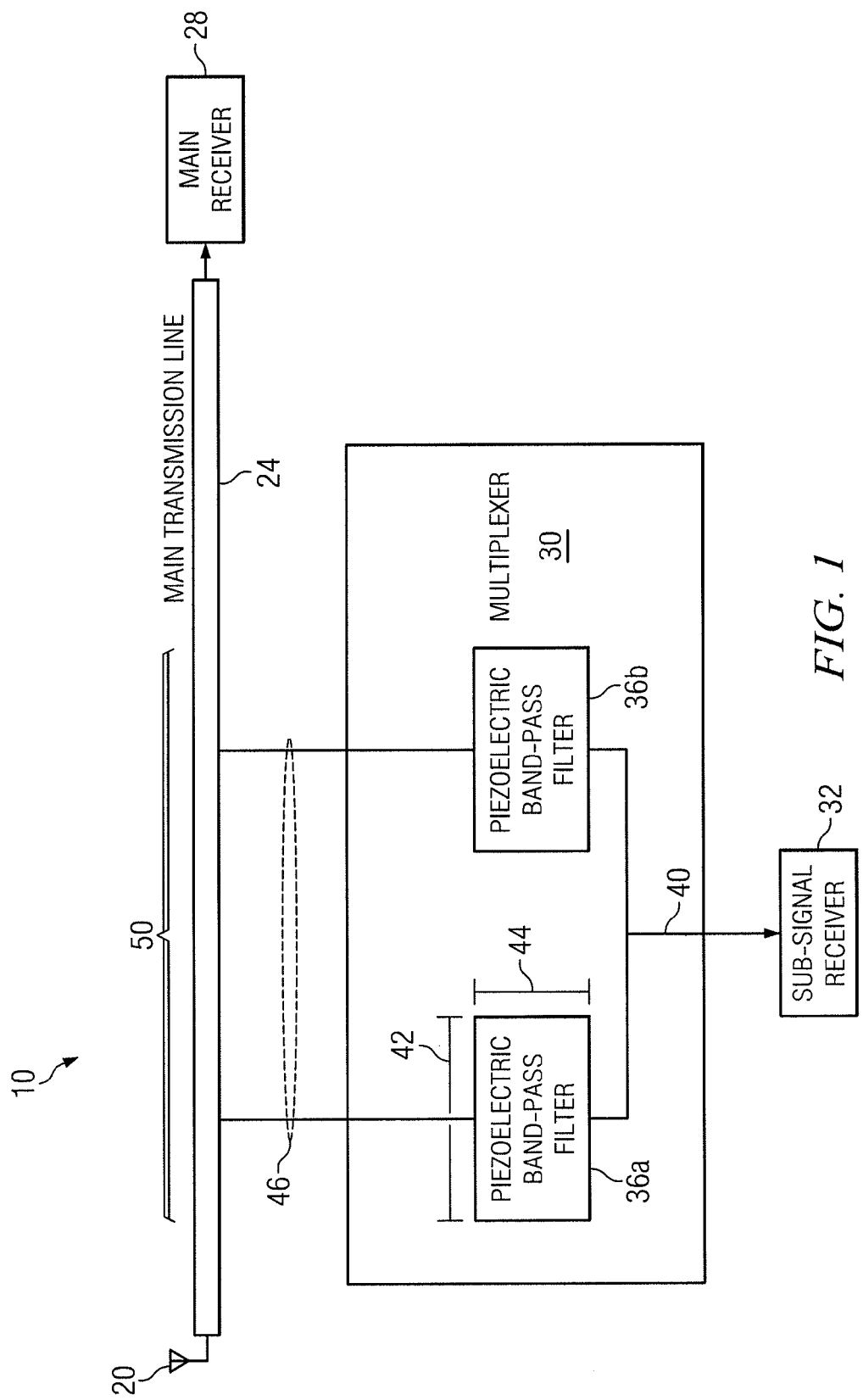
FIG. 1 illustrates an embodiment of a receiver system.
Figure 2:
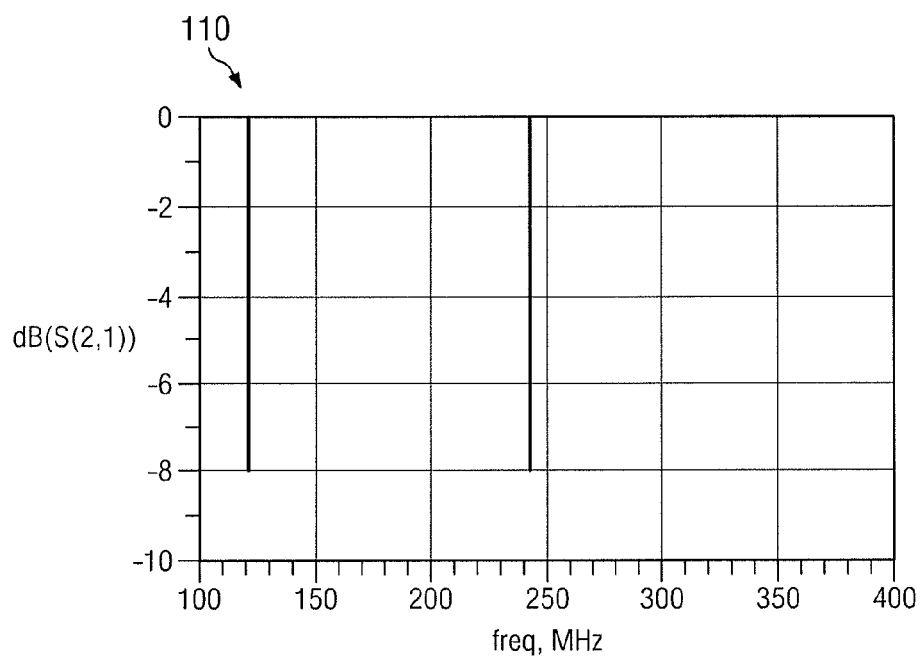
FIGS. 2 through 4 illustrate examples of main line through-loss results from an embodiment of the system of FIG. 1.

Embodiments of the present invention and its advantages are best understood by referring to FIGS. 1 and 2 of the drawings, like numerals being used for like and corresponding parts of the various drawings.

FIG. 1 illustrates an embodiment of a receiver system 10. In the example, system 10 may include piezoelectric filters. Piezoelectric filters may have a relatively narrow bandwidth and may more precisely select signals without causing significant reduction in the quality and/or quantity of usable channels of the main receiver. The piezoelectric filters may be relatively smaller and/or lighter, and thus may not impose significant size and/or weight restrictions.

In the example, system 10 includes an antenna 20, a main transmission line 24, a main receiver 28, a multiplexer 30, and a sub-signal receiver 32 coupled as shown. Multiplexer 30 includes one or more piezoelectric filters 36 (36a,b) and sub-signal transmission line 40.

In certain embodiments, system 10 may be used to select a portion (such as a sub-signal) of the main transmission line usable bandwidth. In the embodiments, main transmission line 24 communicates a main signal from antenna 20 to main receiver 28. Each piezoelectric filter 36 selects a sub-signal of a specific center frequency. A second multiplexing interface at the outputs of the piezoelectric filters combines the sub-signals onto a common sub-signal transmission line 40, which communicates the sub-signals to sub-signal receiver 32.

A sub-signal may be a portion of the main signal frequency range. For example, the main signal may have a bandwidth that covers a range of frequencies. A sub-signal may be a signal that has a bandwidth that is a subset of the range of frequencies. For example, the main signal may have a bandwidth of 0.05 MHz to several MHz in the range of 100 to 400 MHz. A sub-signal may have a bandwidth that ranges from $f-\alpha$ to $f+\alpha$, where f represents a center frequency and $\alpha$ represents a range about the center frequency. In certain embodiments, alpha may have any suitable value, for example a value in the range of less than 0.05 MHz, 0.05 to 0.1 MHz, 0.1 to 0.2 MHz, or greater than 0.2 MHz.

In certain embodiments, sub-signals may be guard signals. Guard signals may be used in emergency situations. For example, guard signals may be used to transmit distress messages from aircraft or to communicate with aircraft that cannot be contacted on their assigned communications channel. A guard signal may have any suitable center frequency, for example, 121.5 MHz or 243.0 MHz.

Antenna 20 transmits and/or receives radio frequency (RF) signals. Examples of antenna 20 include a directional antenna, an omni-directional antenna, or other suitable antenna system. Main transmission line 24 comprises a transmission line that can transmit electromagnetic signals. Examples of transmission lines include wires, cables, strip lines, or any other line that can transmit an electromagnetic signal.

Main receiver 28 receives the main signal and may perform any suitable processing of the main signal. Main receiver 28 may extract information communicated in the signal from a transmitter. In certain examples, the main signal may have been encrypted, encoded, and/or multiplexed by a transmitter before transmission to receiver system 10. In these examples, main receiver 28 may decrypt, decode, and/or demultiplex the main signal.

Multiplexer 30 may be used to select and route one or more sub-signals from the main transmission line. Multiplexer 36 may include any suitable number of piezoelectric filters 36. For example, multiplexer 36 may include one, two, three, or more piezoelectric filters 36.

In certain embodiments, a piezoelectric filter 36 may use piezoelectric material as an electrical-mechanical transducer and/or as a mechanical resonator. Examples of piezoelectric material include crystals (such as quartz) and ceramics (such as barium titanate ceramics or leadzirconate-titanate ceramics). The electrical-mechanical transducer converts an electrical signal to a mechanical wave and then back to an electrical signal. The mechanical resonator vibrates at a resonance frequency. Portions of the mechanical wave with a frequency close to or at the resonance frequency are passed through, while the other portions are rejected. Examples of piezoelectric filters 36 include Surface Acoustic Wave (SAW) filters by COM DEV International Ltd.

In certain embodiments, piezoelectric filters 36 may select for any suitable frequencies. Examples of such frequencies include frequencies in the range of 10 kHz to 3 GHz, such as very-high frequencies (30 MHz to 300 MHz) and ultra-high frequencies 300 MHz and 3 GHz (3,000 MHz). Piezoelectric filters 36 may have any suitable out-of-band input and output impedance, for example, 10 times the characteristic impedance of the main line or greater. Piezoelectric filters 36 may have any suitable number of poles, such as 2, 3, 4, 5, 6, 7, 8, or greater than 8 poles. Examples of responses obtained with 4 pole filters are described in more detail with reference to FIG. 2 through 4.

In the illustrated embodiment, a piezoelectric filter 36 has a width 42 and a height 44. In certain embodiments, width 42 may correspond to an input side with an input 46 where a signal enters filter 36. In certain embodiments, the input side may be the portion of filter 36 disposed closest to, main transmission line 24. Space 50 proximate to main transmission line 24 that components (such as piezoelectric filters 36) occupy may be described as main transmission line space.

Piezoelectric filters 36 may be of any suitable size. In certain embodiments, piezoelectric filters 36 may be relatively small. For example, width 42 may be less than 0.25 inches or 0.25 to 1 inch. If smaller piezoelectric filters 36 are used, then more filters may be placed in multiplexer 30. In the illustrated embodiment, piezoelectric filters 36 occupy less than one-half inches of main transmission line space 50.

In addition, smaller piezoelectric filters 36 may minimize the electrical distance between the input terminals of filters 36 and between the output terminals of filters 36, which may allow for proper multiplexing. Too much distance (such as greater than 0.1 wavelengths) between inputs may cause high out-of-band input impedance of one filter 36a to be transformed to a lower impedance termination at the input of another filter 36b. Too much distance (such as greater than 0.1 wavelengths) between the filter outputs may cause the high out-of-band output impedance of one filter 36a to be transformed to a lower impedance termination at the output of another filter 36b.

Sub-signal transmission line 40 may comprise a transmission line that transmits sub-signals from piezoelectric filters 36 to sub-signal receiver 32. Sub-signal receiver 32 may perform operations similar to the operations described with reference to main receiver 28. In certain embodiments, sub-signal receiver 32 may select a first sub-signal from a first piezoelectric filter or a second sub-signal from a second piezoelectric filter independently of (for example, without using) a radio frequency switching device.

In certain embodiments, sub-signal receiver 32 may be a guard signal receiver. In these embodiments, sub-signal receiver 32 may process emergency messages such as distress signals.

Figure 3:
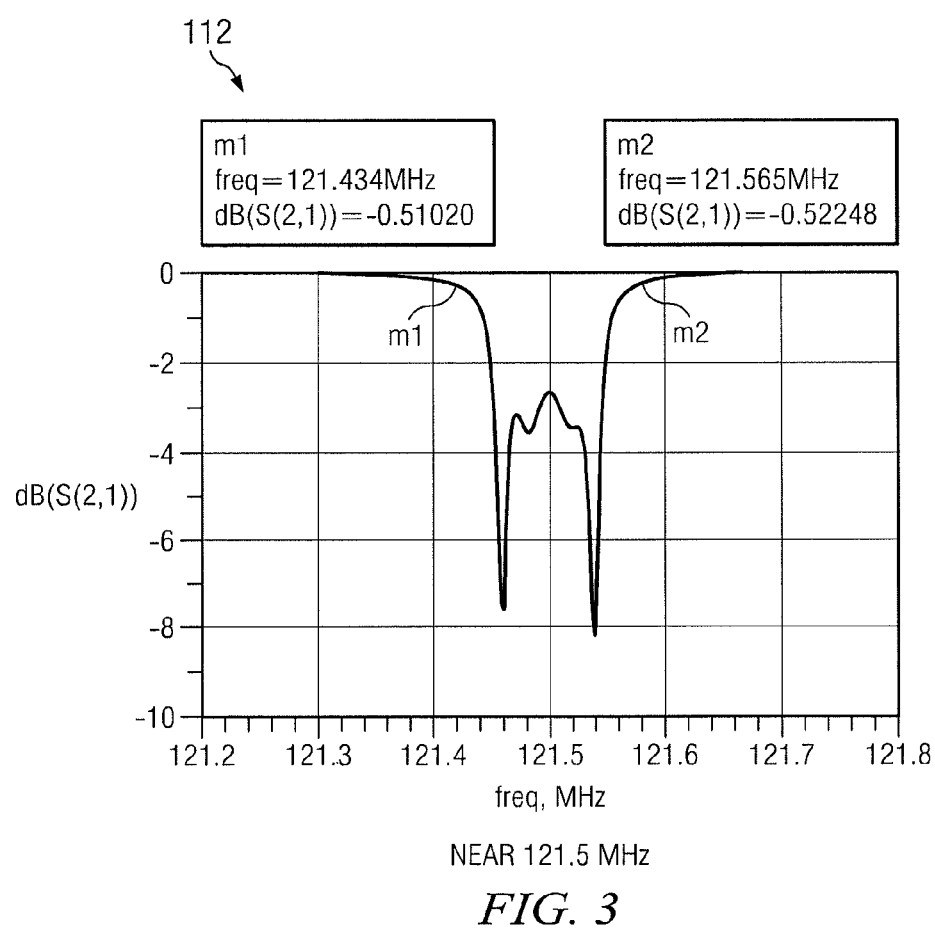
Figure 4:
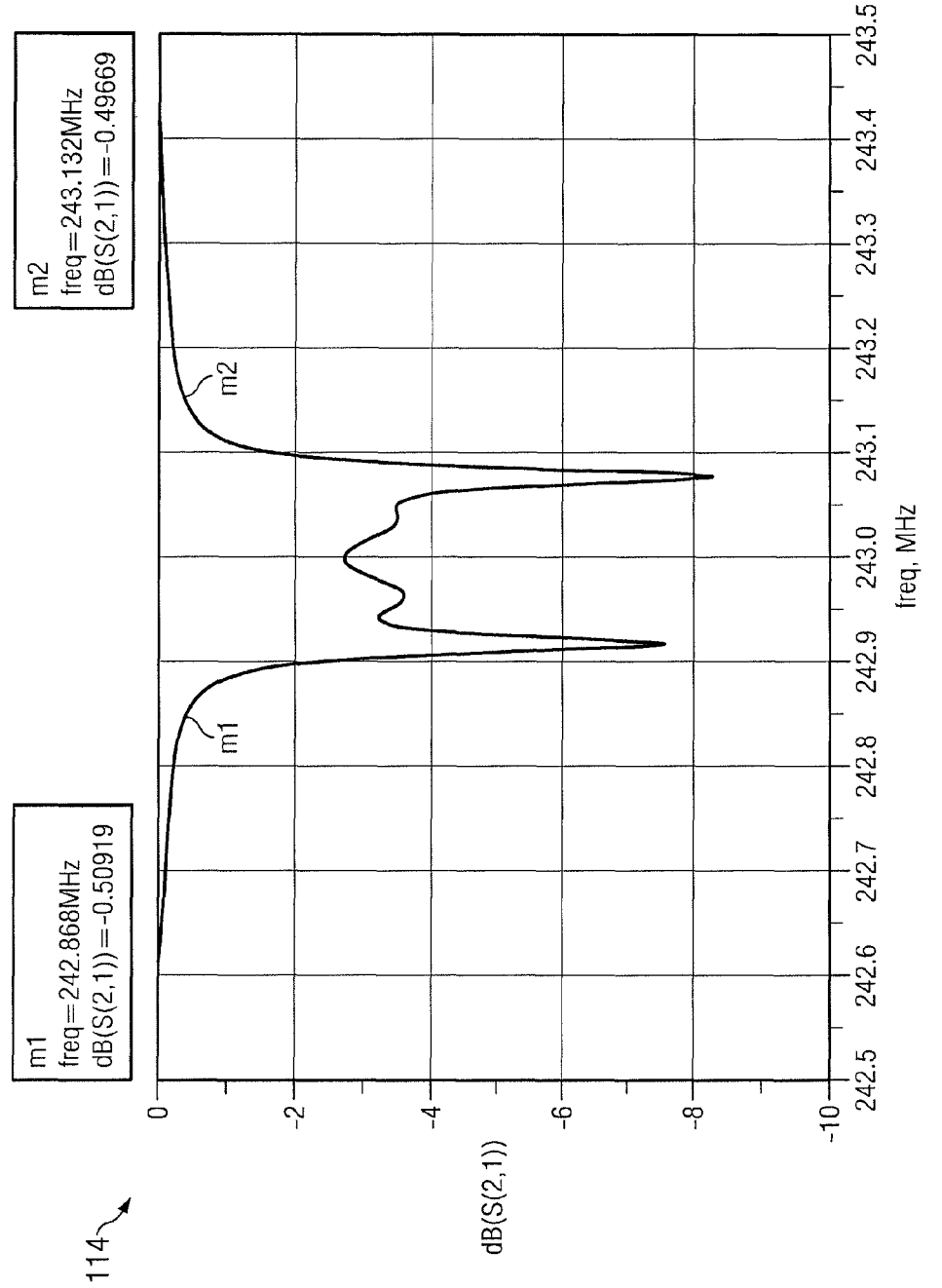

FIGS. 2 through 4 illustrate examples of main line through-loss results from an embodiment of system 10. In the examples, piezoelectric filters 36 of system 10 include two four-pole filters for 121.5 and 243 MHz. Markers m1 and m2 indicate negligible through-loss degradation at frequencies significantly closer to the sub-signal frequencies than achievable with other techniques.

FIG. 2 illustrates graph 110. Graph 110 illustrates a main line through-loss results for the full band ranging from 100 MHz to 400 MHz. FIGS. 3 and 4 illustrate graphs 112 and 114. Graphs 112 and 114 illustrate the through-loss results near and at 121.5 MHz and 243 MHz, respectively. Degraded portions of the main line operating band may be defined as frequencies at which the main line through-loss exceeds 0.5 dB. In the examples, the degraded portions are a little over 0.1% bandwidth (and less than 0.11% centered at 121.5 and 243 MHz, respectively.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of main receiver 28 and sub-signal receiver 32 may be performed by one component, or the operations of main receiver 28 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Certain logic, such as a processor, may manage the operation of a component. Examples of a processor include one or more computers, one or more microprocessors, one or more applications, and/or other logic.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
a main transmission line operable to communicate a main signal from an antenna to a main receiver;
one or more piezoelectric filters coupled to the main transmission line, each piezoelectric filter operable to select a sub-signal of a specific center frequency, a first one of the one more piezoelectric filters comprising a piezoelectric filter having at least four poles; and
one or more sub-signal transmission lines coupled to the one or more piezoelectric filters, each sub-signal transmission line operable to communicate a sub-signal to a sub-signal receiver.

2. The system of claim 1, the one or more piezoelectric filters comprising two or more piezoelectric filters.

3. The system of claim 1, the one or more piezoelectric filters comprising two or more piezoelectric filters occupying less than one-half inches of main transmission line space.

4. The system of claim 1, a piezoelectric filter having at least six poles.

5. A system comprising:
a main transmission line operable to communicate a main signal from an antenna to a main receiver;
one or more piezoelectric filters coupled to the main transmission line, each piezoelectric filter operable to select a sub-signal of a specific center frequency;
one or more sub-signal transmission lines coupled to the one or more piezoelectric filters, each sub-signal transmission line operable to communicate a sub-signal to a sub-signal receiver; and
at least one of the sub-signals comprising a guard signal configured to communicate a distress message.

6. A system comprising:
a main transmission line operable to communicate a main signal from an antenna to a main receiver;
one or more piezoelectric filters coupled to the main transmission line, each piezoelectric filter operable to select a sub-signal of a specific center frequency; and
one or more sub-signal transmission lines coupled to the one or more piezoelectric filters, each sub-signal transmission line operable to communicate a sub-signal to a sub-signal receiver,
the sub-signal receiver operable to select a first sub-signal from a first piezoelectric filter or a second sub-signal from a second piezoelectric filter independently of a radio frequency switching device.

7. A system comprising:
a main transmission line operable to communicate a main signal from an antenna to a main receiver;
one or more piezoelectric filters coupled to the main transmission line, each piezoelectric filter operable to select a sub-signal of a specific center frequency; and
one or more sub-signal transmission lines coupled to the one or more piezoelectric filters, each sub-signal transmission line operable to communicate a sub-signal to a sub-signal receiver,
the one or more piezoelectric filters operable to yield a degraded portion of the main signal of less than 0.11% bandwidth.

8. A method comprising:
communicating, through a main transmission line, a main signal from an antenna to a main receiver;
selecting, by each piezoelectric filter of one or more piezoelectric filters, a sub-signal of a specific center frequency, the one or more piezoelectric filters coupled to the main transmission line; and
communicating, by each sub-signal transmission line of one or more sub-signal transmission lines, a sub-signal to a sub-signal receiver, the one or more sub-signal transmission lines coupled to the one or more piezoelectric filters,
wherein at least one of the one or more piezoelectric filters comprises a piezoelectric filter having at least four poles.

9. The method of claim 8, the one or more piezoelectric filters comprising two or more piezoelectric filters.

10. The method of claim 8, further comprising: selecting, by the sub-signal receiver, a first sub-signal from a first piezoelectric filter or a second sub-signal from a second piezoelectric filter independently of a radio frequency switching device.

11. The method of claim 8, the one or more piezoelectric filters comprising two or more piezoelectric filters occupying less than one-half inches of main transmission line space.

12. The method of claim 8, further comprising: yielding, by the one or more piezoelectric filters, a degraded portion of the main signal of less than 0.11% bandwidth.

13. The method of claim 8, a piezoelectric filter having at least six poles.

14. A method comprising:
communicating, through a main transmission line, a main signal from an antenna to a main receiver;
selecting, by each piezoelectric filter of one or more piezoelectric filters, a sub-signal of a specific center frequency, the one or more piezoelectric filters coupled to the main transmission line; and
communicating, by each sub-signal transmission line of one or more sub-signal transmission lines, a sub-signal to a sub-signal receiver, the one or more sub-signal transmission lines coupled to the one or more piezoelectric filters,
at least one sub-signal comprising a guard signal configured to communicate a distress message.

15. A system comprising:
a main transmission line operable to communicate a main signal from an antenna to a main receiver;
two or more piezoelectric filters coupled to the main transmission line, each piezoelectric filter operable to select a sub-signal of a specific center frequency, each piezoelectric filter having at least four poles, the one or more piezoelectric filters operable to yield a degraded portion of the main signal of less than 0.11% bandwidth; and
one or more sub-signal transmission lines coupled to the one or more piezoelectric filters, each sub-signal transmission line operable to communicate a sub-signal to a sub-signal receiver.

16. The system of claim 15, at least one sub-signal comprising a guard signal configured to communicate a distress message.

17. The system of claim 15, the sub-signal receiver operable to select a first sub-signal from a first piezoelectric filter or a second sub-signal from a second piezoelectric filter independently of a radio frequency switching device.

18. The system of claim 15, the one or more piezoelectric filters comprising two or more piezoelectric filters occupying less than one-half inches of main transmission line space.

* * * * *